United States Patent
Polesel-Maris et al.

(10) Patent No.: US 8,959,661 B2
(45) Date of Patent: Feb. 17, 2015

(54) ATOMIC FORCE MICROSCOPE PROBE, METHOD FOR PREPARING SAME, AND USES THEREOF

(75) Inventors: Jérôme Polesel-Maris, Gif sur Yvette (FR); Thomas Berthelot, Les Ulis (FR); Pascal Viel, Meudon (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 13/997,139

(22) PCT Filed: Dec. 20, 2011

(86) PCT No.: PCT/EP2011/073466
§ 371 (c)(1),
(2), (4) Date: Jun. 21, 2013

(87) PCT Pub. No.: WO2012/084994
PCT Pub. Date: Jun. 28, 2012

(65) Prior Publication Data
US 2013/0276176 A1    Oct. 17, 2013

(30) Foreign Application Priority Data
Dec. 22, 2010  (FR) ...................... 10 61038

(51) Int. Cl.
*G01Q 60/24* (2010.01)
*G01Q 60/38* (2010.01)
(Continued)

(52) U.S. Cl.
CPC .............. *G01Q 60/38* (2013.01); *G01Q 10/045* (2013.01); *G01Q 20/04* (2013.01); *G01Q 60/42* (2013.01); *B82Y 35/00* (2013.01)

USPC ................ 850/33; 850/1; 850/40; 250/458.1; 73/105

(58) Field of Classification Search
USPC .................. 850/1, 33, 40; 250/458.1; 73/105
See application file for complete search history.

(56) References Cited

U.S. PATENT DOCUMENTS 5,641,896 A    6/1997 Karrai
6,240,771 B1   6/2001 Giessibl
(Continued)

FOREIGN PATENT DOCUMENTS

WO  WO 2006/016787  2/2006
WO  WO 2007/087653  8/2007
(Continued)

OTHER PUBLICATIONS

Edwards, H, Taylor, L., and Duncan, W. "Fast, high resolution atomic force microscopy using a quartz tuning fork as actuator and sensor", J. Appl. Phys, vol. 82, No. 3, pp. 980-984, 1997.*
(Continued)

*Primary Examiner* — David Porta
*Assistant Examiner* — Meenakshi Sahu
(74) *Attorney, Agent, or Firm* — Knobbe, Martens, Olson & Bear, LLP

(57) ABSTRACT

An atomic force microscope probe comprising a piezo-electric resonator provided with two electrodes and coated with an insulating layer and a tip attached on the coated resonator and functionalized with at least one group or molecule of interest is disclosed. The disclosed technology also relates to preparation method and to different uses thereof.

22 Claims, 10 Drawing Sheets

(51) Int. Cl.
  *G01Q 10/04* (2010.01)
  *G01Q 20/04* (2010.01)
  *G01Q 60/42* (2010.01)
  *B82Y 35/00* (2011.01)

(56) References Cited

U.S. PATENT DOCUMENTS

| | | | |
|---|---|---|---|
| 6,393,895 | B1 | 5/2002 | Matsiev et al. |
| 7,013,717 | B1 | 3/2006 | Struckmeier et al. |
| 2009/0007645 | A1* | 1/2009 | Shih et al. .................. 73/105 |
| 2010/0068697 | A1 | 3/2010 | Shih et al. |

FOREIGN PATENT DOCUMENTS

| WO | WO 2008/078052 | 7/2008 |
|---|---|---|
| WO | WO 2009/121944 | 10/2009 |

OTHER PUBLICATIONS

Ebner et al. "Localizations of Single Avidin-Biotin Interactions Using Simultaneous Topography and Molecular Recognition Imaging." 2005, ChemPhysChem, vol. 6, pp. 897-900.

Fotino. "Tip sharpening by normal and reverse electrochemical etching." 1993, Rev. Sci. Instrum., vol. 64, pp. 159-167.

Giessibl. "Advances in atomic force microscopy." 2003, Rev. Mod. Phys., vol. 75, pp. 949-983.

Heintz et al. "Characterization of Parylene Coated Combined Scanning Probe Tips for In-Situ Electrochemical and Topographical Imaging." 2001, IEEE-NANO 2001. Proceedings of the 2001 1st IEEE Conference on Nanotechnology, pp. 346-351.

International Search Report for international application No. PCT/EP2011/073466 dated Feb. 2, 2012.

Janshoff et al. "Force Spectroscopy of Molecular Systems-Single Molecule Spectroscopy of Polymers and Biomolecules." 2000, Angew. Chem. Int. Ed., vol. 39, pp. 3212-3237.

Kageshima et al. "Noncontact atomic force microscopy in liquid environment with quartz tuning fork and carbon nanotube probe." Applied Surface Science. Elsevier. 188(3-4):440-444 (2002).

Katan et al. "Quantitative force versus distance measurements in amplitude modulation AFM: a novel force inversion technique." 2009, Nanotechnology, vol. 20, p. 165703.

Koopman et al. "Shear force imaging of soft samples in liquid using a diving bell concept." 2003, Appl. Phys. Lett., vol. 83, pp. 5083-5085.

Muller and Dufrene. "Atomic force microscopy as a multifunctional molecular toolbox in nanobiotechnology." 2008, Nature Nanotechnology, vol. 3, pp. 261-269.

Muller et al. "Force probing surfaces of living cells to molecular resolution." 2009, Nature Chem. Biol., vol. 5, pp. 383-390.

Ng et al. "Improve performance of scanning probe microscopy by balancing tuning fork prongs." 2009, Ultramicroscopy, vol. 109, pp. 291-295.

Rensen et al. "Imaging soft samples in liquid with tuning fork based shear force microscopy." 2000, Appl. Phys. Lett., vol. 77, pp. 1557-1559.

Sader et al. "Accurate formulas for interaction force and energy in frequency modulation force spectroscopy." 2004, Appl. Phys. Lett., vol. 84, pp. 1801-1803.

Uchihashi et al. "Quantitative force measurements in liquid using frequency modulation atomic force microscopy." 2004, Appl. Phys. Lett., vol. 85, pp. 3575-3577.

Van et al. "Experimental three-dimensional description of the liquid hexadecane/graphite interface." Langmuir. American Chemical Society. 25(2):639-642 (2009).

Wang et al. "Evaluating Protein Attraction and Adhesion to Biomaterials with the Atomic Force Microscope." 2004, Langmuir, vol. 20, pp. 7753-7759.

Maali et al. "Hydrodynamics of oscillating atomic force microscopy cantilevers in viscous fluids." Journal of Applied Physics. vol. 97, pp. 074907-1 to 074907-6 (2005).

French Preliminary Search Report for FA 745672 / FR 1061038 dated Apr. 4, 2011.

Lee, Yeolho et al., "Label-Free Detection of a Biomarker with Piezoelectric Micro Cantilever Based on Mass Micro Balancing", Journal of Laboratory Automation 2008; 13:259.

Makky, Ali et al. "Piezoelectric tuning fork probe for atomic force microscopy imaging and specific recognition force spectroscopy of an enzyme and its ligand", J. Mol. Recognit. 2013; 26: 521-531.

Welker, Joachim et al., "The Influence of Chemical Bonding Configuration on Atomic Identification by Force Spectroscopy", ACS Nano 2013; 7:8, 7377-7382.

* cited by examiner

ATOMIC FORCE MICROSCOPE PROBE, METHOD FOR PREPARING SAME, AND USES THEREOF

RELATED APPLICATIONS

This application is a U.S. National Phase of International Application No.: PCT/EP2011/073466, filed Dec. 20, 2011, which claims the benefit of French Patent Application No. 10 61038 filed Dec. 22, 2010, each of which is incorporated by reference in their entirety.

FIELD OF THE INVENTION

The present invention belongs to the field of sensors and more particularly to the field of Atomic Force Microscope (AFM) probes, notably useful in biology.

More particularly, the present invention relates to the use of an AFM probe such as a probe with an integrated piezo-electric sensor and to the methods for preparing this probe for fine chemical analysis of molecular bonds by means of chemical force spectroscopy in a liquid medium and notably in a biological liquid medium.

The direct applications of this type of probe typically cover the DNA sequencing, customized diagnosis, pharmacological engineering and molecular tests in the nano-toxicological field.

BACKGROUND

The use of microlevers (or standard AFM cantilevers, combined with detection by an external optical lever involving a laser or a photodiode, for chemical force spectroscopy in the analysis of molecular bonds has already been demonstrated and systematically applied (Janshoff et al., 2000, Angew. Chem. Int. Ed., Vol 39, pages 3212-3237).

Several patents and patent applications relate to chemical force spectroscopy using an AFM tip. U.S. Pat. No. 7,013,717 in the name of Veeco Instruments Inc., contemplates the grafting of single-stranded DNA on the tip of an AFM cantilever and of a complementary single-stranded DNA on the probed surface. International Application WO 2007/087653 in the name of the University of Linz, proposes a method for detecting 5-methylcytosine involving anti-5-methylcytosine antibodies grafted on the tip of an AFM cantilever.

Further, certain recent commercial chemical force spectroscopy systems begin to appear on the market like the automated machine proposed by the nAmbition or JPK companies.

In parallel, the use of AFM probes with an integrated piezo-electric sensor has already been demonstrated by several teams worldwide.

In particular, in U.S. Pat. No. 5,641,896, Karraï uses, for applications in near-field optical microscopy (or SNOM for « Scanning Near-field Optical Microscopy» ), the force return provided by the piezo-electric probe for approaching an optical fiber adhesively bonded on the probe at a few tens of nanometers from the surface. U.S. Pat. No. 6,240,771 describes the use of such an AFM probe with an integrated piezo-electric sensor with a metal, well sharpened tip, adhered to the end of the probe in order to scan crystals with atomic resolution. Kaghesima et al. (2002, Applied Surface Science, Vol. 188, pages 440-444) and Rensen and van Hulst (2000, Appl. Phys. Lett., Vol. 77, pages 1557-1559) have also demonstrated the use of this probe for AFM in a liquid medium with total immersion of the probe, in an organic solution or in ultrapure water respectively. Other teams have used the piezo-electric probe outside the liquid, but with the tip immersed in a liquid meniscus for probing the surface below (for example Koopman et al., 2003, Appl. Phys. Lett., Vol. 83, pages 5083-5085).

Finally, some studies have illustrated the use of these probes with integrated piezo-electric sensor for analyzing the properties of liquids such as viscosity and density (U.S. Pat. No. 6,393,895 in the name of Symyx Technologies Inc.) or as a chemical nose allowing detection of selectively grafted molecules (U.S. Pat. No. 6,393,895 and patent application US 2010/0068697 in the name of Drexel University).

Probes with an integrated sensor like piezo-electric sensors have several advantages as compared with a standard AFM cantilever since they give the possibility of getting rid of the conventional optical detection system of the latter. They are easier to integrate and to use in extreme environments. But an essential point as to their use in biological applications is the requirement of their being able to be immersed in a biological solution while retaining good mechanical and electrical behavior. This condition is not obvious to meet because the saline solutions used in biology such as HEPES, Tris or PBS are extremely conductive because of the presence of many ions in the aqueous medium. Thus, the probe cannot be used as such in these liquids because of inevitable problems of electric leakages, short-circuits or corrosion effects on the electrodes of the piezo-electric sensor.

The inventors therefore set themselves the goal of proposing a system comprising an AFM probe and notably an AFM probe with an integrated piezo-electric sensor useful for analyzing molecular bonds in chemical force spectroscopy and this, in buffer solutions, notably in solutions applied in the field of biology. The AFM probe should further retain good mechanical and electrical properties, have a good quality factor, when the latter is used in buffer solutions and be obtained by a method simple to apply. As a reminder, the quality factor is a description of the damping of an oscillating system. It is given by the ratio between the transmitted energy and the lost energy. In the case of a probe, the quality factor represents the energy transmitted in the pass band around the resonance relatively to the energy contained outside the pass band.

SUMMARY OF CERTAIN INVENTIVE ASPECTS

The inventors solved the aforementioned technical problems and achieved the set goals. Indeed, the present invention relates to an atomic force microscope probe comprising:

i) a piezo-electric resonator provided with two electrodes and coated with an insulating layer; and ii) a tip attached on said resonator coated and functionalized with at least one group or one molecule of interest.

The AFM probe according to the present invention is a probe with an integrated piezo-electric sensor. Indeed, it is based on a piezo-electric material associated with two electrodes. Advantageously, the body of the AFM probe according to the present invention is made with a single piezo-electric material. Both electrodes associated with the piezo-electric material give the possibility of exciting the resonator by applying an oscillating voltage. These same two electrodes are also used for analyzing the response of the piezo-electric resonator with a current-voltage amplifier converting the displacement current into a voltage. In other words, the AFM probe according to the invention only comprises two electrodes for actuation and detection of the movement. FIG. 1A illustrates the equivalent electric model of the piezo-electric resonator in air. C_quartz is the capacitance proportional to mechanical stiffness, L_quartz is the inductance proportional to the effective mass of the probe and R_quartz is the resistance proportional to the damping of the probe (because of the energy losses). C_stray_quartz is a parasitic capacitance formed by both electrodes around the piezo-electric material. Therefore, if one of the three mechanical properties mentioned earlier, i.e. mass, stiffness and damping, is modified by the external environment of the probe, this causes a modification of the electric response detected by the amplifier.

Further, as the applied resonator within the scope of the present invention is coated with an insulating layer and may be used in a biological solution, the liquid medium but also the coating modify the mechanical properties and therefore the electric properties of the piezo-electric resonator as illustrated by the circuit of FIG. 1B.

The piezo-electric resonator applied within the scope of the present invention is advantageously in a piezo-electric material which has the advantage of being directly piezo-electric. Thus, no biasing step under high pressure is required for aligning the domains and obtaining piezo-electric properties, such biasing being required, for example, for polycrystalline piezo-electric ceramics. Further, the piezo-electric material applied within the scope of the present invention retains stable piezo-electric properties over time. This piezo-electric material is notably selected from quartz, topaz, tourmaline, berlinite, aluminum nitride, zinc oxide, cadmium sulfide, lead titanate, lead titanium-zirconate, lithium niobate, lithium tantalate, potassium niobate, iangasite, gallium arsenide, sodium barium niobate, germanium bismuth oxide, indium arsenide, antimonide, a piezo-electric polymer such as polyvinylide fluoride (PVDF) and derivatives thereof, as well as mixtures thereof.

More particularly, the piezo-electric resonator applied within the scope of the present invention is in quartz.

The electrodes applied within the scope of the present invention are advantageously metal and notably in a metal selected from gold, nickel, aluminum, copper, tin and silver.

The piezo-electric resonator provided with two electrodes applied within the scope of the present invention may appear in all the configurations and geometries notably contemplated in AFM probes. More particularly, the piezo-electric resonator provided with two electrodes appears as a piezo-electric tuning fork with an electrode positioned on each of the branches of the tuning fork, or in an interdigitation configuration of the electrode positioned on both branches of the tuning fork.

The insulating layer used for coating the resonator of the probe according to the present invention corresponds to a passivation layer required for protecting the electrodes of this probe from any contact with the liquid. It is present on the whole of the resonator and on a portion of the electrodes with which it is provided. Indeed, the ends of the non-passivated electrodes ensure good electric contact of the resonator and notably of the piezo-electric tuning fork to a connector connected to the downstream amplification chain. The critical portion to be isolated and protected from the biological liquid medium via the depositing of an insulating layer is the resonator and notably the operating piezo-electric tuning fork. This coating should meet several conditions which are:
- being chemically and mechanically stable in a saline solution,
- having a wide electric resistance barrier for avoiding current leakages of less than a few pico-amperes (the displacement current or of the probe have an order of magnitude of tens of pico-amperes),
- having a low dielectric constant relatively to frequency in order to avoid a strong parasitic capacitance effect (see FIG. 1B) with the added parasitic capacitance C_stray_coating due to the coating layer,
- being compliant with the geometry of the probe wherein acute and singular angles may be present,
- being thin in order to avoid affecting too much the mechanical properties of the probe,
- being biocompatible and non-toxic.

Any insulating layer meeting the aforementioned conditions may be used for coating the resonator of the probe according to the invention.

Advantageously, this insulating layer may be a commercial electrophoretic cathodic or anodic paint notably used in the automotive industry for coating the structure of the car and protecting it against corrosion, but also in the food industry in order to coat the inner portion of canned foods for avoiding any contact of the metal with the food. Further, this type of paint has already been used for insulating the tip of a tunnel effect microscope and of a scanning electrochemical microscope. As an example of such a paint, mention may be made of the electrophoretic paint GLASSOPHOR from BASF and of the electrophoretic paint CLEARCLAD from CLEARCLAD COATINGS Inc.

Alternatively, this insulating layer may be in a material selected from silicon dioxide, parylene or another derivative of [2,2]paracyclophane, polyimidine, aluminum oxide, aluminum nitride, a vinyl polymer and a hydrophobic silane, notably a hydrophobic silane as defined in patent application US 2010/0068697. More particularly, within the scope of the present invention, the insulating layer is a layer in parylene.

The insulating layer, as indicated earlier, should be thin in order to avoid affecting too much the mechanical properties of the probe. Therefore, its thickness will depend on the size of the piezo-electric resonator and notably on the size of the tuning fork. Thus, the insulating layer applied in the invention advantageously has constant or substantially constant thickness on the piezo-electric resonator. This thickness is typically comprised between 50 nm and 20 μm, notably between 250 nm and 10 μm and, in particular, between 750 nm and 5 μm.

Within the scope of the present invention and of atomic force microscopy generally, the attached and notably adhesively bonded tip on the resonator probes the surface to be scanned, studied, characterized and/or analyzed. This tip appears as a wire, a fiber or a nanotube. Further, it has a defined apex like the terminal portion of the tapered tip or of the nanotube subject to the interaction via the grafted group or molecule for analysis of the molecular bonds in chemical force spectroscopy.

The tip applied within the scope of the present invention comprises at least one material selected from platinum, chromium, chromium-gold, platinum-iridium, titanium-platinum, titanium nitride, tungsten carbide, tungsten, carbon or one of their mixtures.

Advantageously, the tip according to the invention may only consist of one of the materials listed earlier. Depending on the material making it up, the tip may be more or less flexible, or even more or less stiff. It may notably be in platinum-iridium or in platinum.

Alternatively, the tip according to the invention may have two distinct areas, each consisting of one of the materials listed earlier.

Indeed, the work of the inventors has shown that, during immersion in a solution, a too flexible tip will be distorted by the fluidic and electrostatic interaction with the liquid while avoiding its contact with the surface. The reduction of the length of this highly flexible tip will increase its stiffness and therefore its stability so that it remains straight during operation in a liquid medium. But attaching such a flexible tip with a specific chemical functionalization, with reduced length for sufficiently increasing its stiffness, directly to the resonator and notably directly to a branch of the tuning fork, will not be compatible with the operation of the tip alone immersed in a solution. In this configuration, the body of the piezo-electric resonator is kept outside the liquid so as to obtain the highest sensitivity with a high quality factor. The inventors therefore proposed the addition of a stiff (rigid) long tip between the resonator and notably the branch of the tuning fork and the flexible tip with a specific chemical functionalization which will be in contact with the surface. In this alternative, the tip has:

- a $1^{st}$ element attached and notably adhesively bonded to the resonator (stiff portion) and
- a $2^{nd}$ element (flexible portion) attached and notably adhesively bonded to the first element and functionalized by a group or molecule of interest.

Advantageously, the $1^{st}$ element is a platinum/iridium wire and the $2^{nd}$ one is a platinum wire, a graphite fiber or a carbon nanotube. This $2^{nd}$ element forms the apex as defined earlier.

Regardless of the contemplated alternative, the tip applied within the scope of the present invention has a total length comprised between 2 µm and 5 mm, notably between 3 µm and 1 mm and, in particular between 4 µm and 100 µm. In the case of the alternative of a tip with two distinct elements, the length of the first element is comprised between 2 µm and 4 mm and notably between 3 µm and 1 mm and the length of the 2nd element is comprised between 400 nm and 50 µm and, notably between 800 nm and 10 µm.

The apex of the tip of the probe according to the present invention is functionalized by at least one group of interest or at least one molecule of interest.

By « group of interest» (or « molecule of interest» ), is meant within the scope of the present invention a group (or a molecule) which may chemically interact with another group or another molecule possibly present at a surface to be scanned, studied, characterized and/or analyzed by atomic force microscopy. This chemical interaction may involve a covalent bond between the molecule or a non-covalent bond such as a hydrogen or ionic bond.

Within the scope of the present invention, the group of interest may be a simple or complex chemical group. It is notably selected from —OH, —C(O)OH, —NH$_2$, —CH$_3$, —C(O)O$^-$, —NH$_3^+$, —C(O)H, —N$_3$, or a terminal alkene.

Within the scope of the present invention, the molecule of interest is a natural or synthetic, notably biological molecule. Advantageously it is selected from peptides, oligopeptides, proteins such as enzymes, antibodies or antibody fragments, cell or membrane receptors, polysaccharides, cells or cell portions such as organites or cell membranes, nucleic acids such as DNA or RNA, and natural or synthetic molecules with a therapeutic purpose.

The functionalization of the tip by the group or molecule of interest consists in grafting, via at least one covalent bond, the group or molecule of interest to the surface of the apex of the tip. This grafting may be direct or indirect. Advantageously, the functionalization of the tip by the group or molecule of interest is indirect and involves a linker covalently bound to the tip on the one hand and notably to the surface of the apex of the tip and to the group or to the molecule of interest on the other hand.

Any linker commonly used in chemistry may be used within the scope of the present invention. However, the linker applied within the scope of the present invention advantageously comprises a (hetero)arylene group. The bond arm may only comprise a (hetero)arylene group. Alternatively, the bond arm may correspond to a (hetero)arylene group bound to another group of the mobile molecular chain type such as a polyethylene glycol (PEG) group. With this alternative, it is possible to give to the group or molecule of interest, a greater degree of freedom as compared with the same group or with the same molecule directly bound to the (hetero)arylene group. This increase in the degree of freedom in fact promotes possible interactions with the surface to be scanned, studied, characterized and/or analyzed.

Within the scope of the present invention, by « arylene group» is meant an aromatic hydrocarbon structure consisting of one or more aromatic rings each including from 3 to 10 carbon atoms, notably from 3 to 8 carbon atoms and in particular 6 carbon atoms.

Within the scope of the present invention, by a « heteroarylene group» , is meant a heteroaromatic hydrocarbon structure consisting of one or more heteroaromatic rings each including from 3 to 10 carbon atoms, notably from 3 to 8 carbon atoms and in particular 6 carbon atoms, the heteroatom(s) may be N, O, P, Si or S, notably N, O, or S. The heteroatoms may in particular interrupt an aromatic ring and/or separate two aromatic rings from an arylene group.

The present invention also relates to a method for preparing an atomic force microscope probe as described earlier. The method according to the invention comprises the steps consisting in:

a) depositing on a resonator provided with two electrodes an insulating layer in return for which a resonator is obtained;

b) attaching a tip on the resonator provided with two electrodes and coated with an insulating layer obtained in step (a);

c) optionally cutting and/or etching the tip attached during step (b);

d) functionalizing the tip attached and refined during steps (b) and (c), with a group or molecule of interest.

Step (a) of the method according to the invention consists in depositing an insulating thin layer as defined earlier on the surface of the resonator. This deposition may be carried out by any technique giving the possibility of obtaining a thin layer. Advantageously, said deposition is carried out by dip coating, by spray coating, by spin coating, by pyrolytic or electrochemical physical deposition.

More particularly, the deposition during step (a) of the method according to the invention is a pyrolytic physical deposition or an electro-deposition. FIG. 3 and the experimental part hereafter describe a system used for the embodiment involving electro-deposition. One skilled in the art will be aware, depending on the nature and on the composition of the insulating layer to be produced, of the electrophoretic bath and the operating procedure which are the most suitable. The experimental part hereafter also shows a procedure involving pyrolytic physical deposition of monomers, the corresponding insulating layer corresponding in this case to the obtained polymer.

It should be noted that the passivation methods known for intrinsic conducting materials and with simple geometry may be more difficult to apply when the piezo-electric resonator appears as a tuning fork. Indeed, passivation may alter the mechanical properties, notably via a meniscus effect, of this system provided with electrodes and with a more complex geometry.

From the results obtained for resonators of the piezo-electric tuning fork type and described in the experimental part, it appears that:

when the insulating layer is an electrophoretic paint, the latter is preferably electrodeposited by applying a voltage ramp from 0 V to a voltage comprised between 5 V and 50 V, notably between 10 V and 25 V and, in particular, of the order of 17 V (i.e. 17 V±2 V) and this, in a time comprised between 1 min and 20 min, notably between 2 min and 10 min and, in particular of the order of 5 min (i.e. 5 min±2 min). Such a method gives the possibility of obtaining a compliant deposit on the tuning fork without any current leakage, without any sensitivity loss and without any alterations of the mechanical properties.

passivation with parylene known for systems with a simple shape of the beam or disc type and involving a pyrolytic physical deposition of monomers has never been described on systems with a piezo-electric resonator of a complex geometry of the tuning fork type, and, the improved results obtained with such an insulating layer on tuning forks has never been described or suggested.

Step (a) may be repeated several times and notably at least twice, three or four times until an insulating layer having satisfactory thickness is obtained.

Also, step (a) may comprise a step for annealing the insulating layer, notably when the insulating layer is an electrophoretic paint, once the latter has been deposited. This annealing step is advantageously carried out between 80° C. and 180° C. and notably between 110° C. and 160° C. for 5 min to 60 min.

Several studies have described various methods for attaching a tip to the end of a piezo-electric resonator (U.S. Pat. No. 5,641,896 and Giessibl, 2003, Rev. Mod. Phys., Vol. 75, pages 949-983), the latter may be used during step (b) of the method.

Advantageously, the tip is attached onto the resonator by means of a conductive adhesive such as conductive epoxy adhesive and notably the Epotek H21D adhesive. In the alternative described earlier wherein the tip consists of two distinct elements, a conductive adhesive either identical or different, is used for adhesively bonding the $1^{st}$ element to the resonator, on the one hand and the $2^{nd}$ element to the $1^{st}$ element, on the other hand.

The tip is adhesively bonded so as to be perpendicular to the surface to be scanned, studied, characterized and/or analyzed. For this reason, it should be adhesively bonded at a certain angle on the resonator and notably on the branch of the tuning fork, this angle depending on the geometrical configuration of the subsequently used atomic force microscope probe support.

The length of the tip, whether it comprises one or two elements, is critical for carrying out accurate measurements and without any artifact. In particular, in the case of a tip with two elements, the length of the $1^{st}$ element (stiff portion) and also the length of the $2^{nd}$ (flexible or supple portion) are very critical in order to retain good oscillation properties and for avoiding artifacts in the measurements because of the deformation of the flexible tip during the approach of the tip towards the surface. Therefore, it may be necessary to cut and/or etch the tip of the probe or the different elements making it up. In this case, step (c) is not optional.

Step (c) more particularly consists in an electrochemical etching step for the tip comprising one or two element(s).

Electrochemical etching is a well known method in the field of STMs for preparing sharpened tips, the radius of which has a few nanometers, required for obtaining lateral high resolution images. An electrochemical section of the tip (from a few millimeters to several tens of micrometers in length), but also fine etching of the apex (below 100 nm) of the tip attached on the resonator may be obtained. The geometry proposed by Fotino (1993, Rev. Sci. Instrum., Vol. 64, pages 159-167) for etching tungsten tips, allows more efficient etching by using the shearing force (stress) of the flow of bubbles produced during the etching reaction.

The experimental part hereafter proposes procedures as to the chemical etching to be applied for platinum/iridium tips and/or platinum tips. On the basis of this teaching and on the basis of the knowledge from the state of the art, one skilled in the art will be able to determine the optimum operating conditions for chemical etching to be applied during step (c) of the method depending on the nature of the tip of the probe.

The chemical procedure for functionalizing the tip of the probe with a group or molecule of interest, during step (d) of the method may consist in any procedure giving the possibility of covalently and directly or indirectly grafting such a group or such a molecule at the surface of the tip of the probe.

Advantageously, this procedure applies the methods described in international applications WO 2008/078052 and WO 2009/121944 in the name of the CEA. These applications describe the grafting of molecules from cleavable aryl salts and notably from aryl diazonium salts by applying non-electrochemical conditions.

More particularly, step (d) of the method according to the invention applies at least one element selected from an aryl diazonium salt bearing a group of interest or a precursor of such a group, an aryl diazonium salt bearing a molecule of interest or a precursor of such a molecule, an aryl diazonium salt bearing an amine function or a precursor of such aryl diazonium salts.

By <<precursor>> is meant, within the scope of the present invention, an entity separated from the group of interest, from the molecule of interest or from the aryl diazonium salts by a single operating step, easy to apply. The precursors may have greater stability than the group of interest, the molecule of interest or the aryl diazonium salts under the same environmental conditions. For example, arylamines are precursors of aryl diazonium salts. Indeed, by a simple oxidation reaction, for example, with $NaNO_2$ in an acid aqueous medium, or with $NOBF_4$ in an organic medium, it is possible to form the corresponding aryl diazonium salts. Also, an aryl diazonium salt bearing a group —$NH_2$ may be used for functionalizing the tip with an —OH group as shown at point III.2(C) hereafter.

Also, an aryl diazonium salt bearing a —$NH_2$ group may be grafted onto the tip of the probe and then be re-deazotized so as to react with a molecule of interest or with a molecule bearing a group of interest. The molecule of interest and the molecule bearing a group of interest within the scope of the present invention correspond to the molecule of interest of international application WO 2009/121944. The example of point III.2(D) illustrates this particular embodiment.

One skilled in the art will find information as to the operating procedures and notably as to the non-electrochemical conditions to be applied in international applications WO 2008/078052 and WO 2009/121944 and other teachings resulting from the methods described in the latter.

The present invention also relates to the use of a probe as defined earlier or which may be prepared by a method as defined earlier in atomic force microscopy and notably for chemical force spectroscopy in a biological solution and for AFM imaging in a biological solution. More particularly, these probes are used in a dynamic mode at an excitation frequency close to or equal to their resonance frequency. Alternatively, these probes are used in a dynamic mode off-resonance at an excitation frequency away from their resonance frequency or at a frequency corresponding to a different harmonic of their fundamental resonance frequency.

It should be noted that, up to now, no piezo-electric resonator of the piezo-electric tuning fork type has been used with a functionalized tip and/or in biology, as well as the use of this system for chemical force spectroscopy has never been described, nor even envisioned.

At the present time, three main methods for conducting dynamic probes in AFM are (1) Frequency Modulation-AFM (FM-AFM) also called «Non-contact-AFM», (2) Amplitude-Modulation-AFM (AM-AFM), also called «Tapping AFM» and (3) Phase Mode-AFM (PM-AFM). According to the method used, the different changing dynamic output variables (change in frequency, amplitude, change in phase), acquired during AFM may be converted into values of the interaction force between the end of the tip and the surface to be scanned, studied, characterized and/or analyzed.

Within the scope of the present invention, the probe is advantageously used in the AM-AFM mode. In the latter, the signals acquired at the output by approach/withdrawal spectroscopy are the oscillation amplitude and the phase lag relatively to the relative tip-surface distance. Both of these pieces of information (amplitude and phase relatively to the distance) may then be used for recovering the chemical interaction forces between the tip and the surface by using the formalism proposed elsewhere (Sader et al., 2004, Appl. Phys. Lett., Vol. 84, pages 1801-18003; Katan et al., 2009, Nanotechnology, Vol. 20, page 165703; Uchihashi et al., 2004, Appl. Phys. Lett., Vol. 85, pages 3575-3577).

The chemical interaction between the surface to be analyzed and the tip attached to the end of the resonator and notably to the end of one of the branches of the piezo-electric tuning fork will modify the resonance properties of the piezo-electric resonator. In other words, the detected modifications of the resonance properties of the piezo-electric probe are directly related to the chemical information on the chemical bonds between the end of the tip and the surface as shown in FIG. 2. In this schematization, the probe comprises a piezo-electric tuning fork (1), having a tip (2) functionalized by a group or molecule of interest (3). It is put into contact with a solid substrate (6) on which is grafted a receptor (5), thus giving the possibility of appreciating the chemical interactions (4) between this receptor and the group or molecule of interest.

The final analysis of the chemical bonds uses several chemical force curves acquired with the probe for various loading rates (or approach-withdrawal rates) in order to obtain a Bell-Evans diagram. This Bell-Evans diagram, described by Muller and Dufrêne, 2008 (Nature Nanotechnology, Vol. 3, pages 261-269 et Müller et al., 2009, Nature Chem. Biol., Vol. 5, pages 383-390) gives the possibility of obtaining quantitative and qualitative chemical information on the energy scene of chemical bonds. The dissociation rate $k_{off}$, the potential barriers (free enthalpies), the transition distances may be directly obtained versus the loading rate, but also versus the temperature or the pH of the solution.

It is thus possible to observe that if there is a phenomenon of attraction, repulsion or harpooning between the group or the molecule of interest functionalizing the tip of the probe and the surface to be scanned, studied, characterized and/or analyzed.

Therefore, the present invention finds applications in the field of diagnosis, of DNA sequencing by detecting hybridation between complementary DNA or RNA strands between a target strand attached on the tip of the probe according to the present invention and a strand in solution or attached on a surface and/or of the detection of compounds with a therapeutic interest of the type of sugars, proteins, antibodies or oligopeptides.

Indeed, it is possible to envision grafting, on a surface such as a surface of a solid support in silicon, in glass, in metal, in polymer or in plastic, of a membrane receptor notably involved in a pathological condition. The grafting may apply a method as described in international applications WO 2008/078052 and WO 2009/121944. The thereby grafted receptor is maintained in a biological medium or a suitable buffer notably so that it appears in a native configuration. The probe according to the invention is functionalized by a synthetic or natural molecule, for which a possible potential in the treatment of the pathological condition is desirably known. The present invention will give the possibility of knowing whether there exists an attraction, repulsion or harpooning phenomenon between this molecule and the grafted receptor.

Other features and advantages of the present invention will further become apparent upon reading the examples hereafter given as an illustration and not as a limitation and referring to the appended figures.

DETAILED DISCUSSION OF PARTICULAR EMBODIMENTS

I. Piezo-Electric Tuning Fork.

The piezo-electric probe used is a piezo-electric resonator in quartz with two metal electrodes obtained by physical deposition (spraying or evaporation of a metal target) of an adhesion layer in chromium or titanium (thickness of the order of 50 nm) followed by a second deposition of nickel or gold (thickness of the order of 400 nm) appearing as a commercially accessible tuning fork (for example CITIZEN AMERICA CFS206).

II. Insulating Coating.

II.1. Electrophoretic Paint Coating.

After an ultrasonic bath of the quartz resonator in ethanol and acetone, the quartz probe is coated in a GLASSOPHOR bath from BASF, with an electrophoretic cathodic paint, followed by rinsing with ultrapure Millipore water and finally by annealing.

Figure 1A:
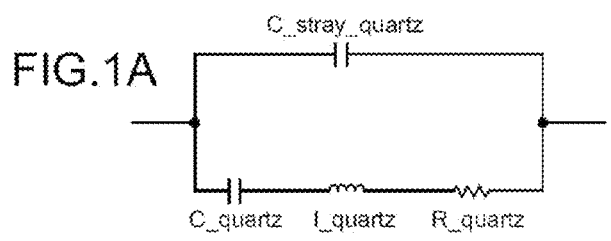
FIG. 1 shows electric circuits equivalent to the Butterworth-Van Dyke circuits of a quartz: in vacuo or in air (FIG. 1A), with a coating and immersed in a liquid (FIG. 1B).
Figure 1B:
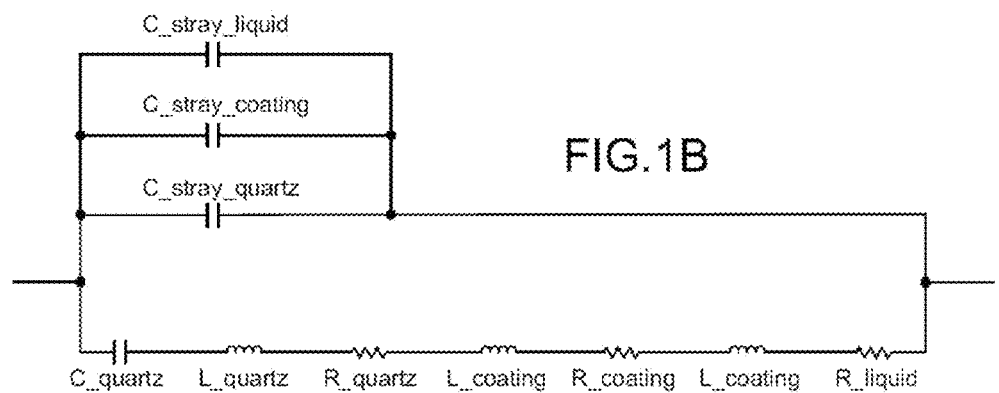
Figure 2:
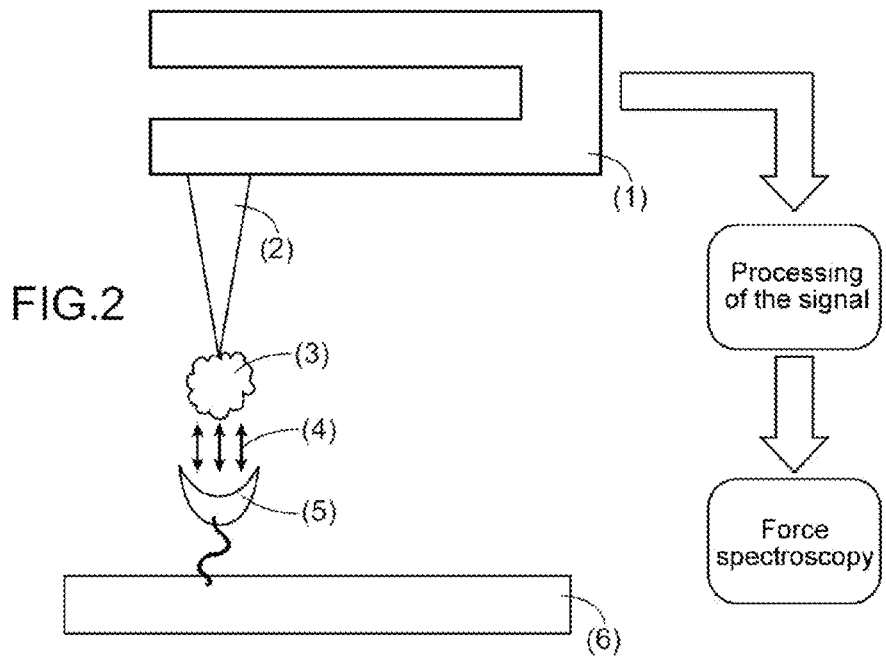
FIG. 2 is a schematization of the probe with an integrated piezo-electric sensor for determining the chemical interactions at a molecular level.
Figure 3:
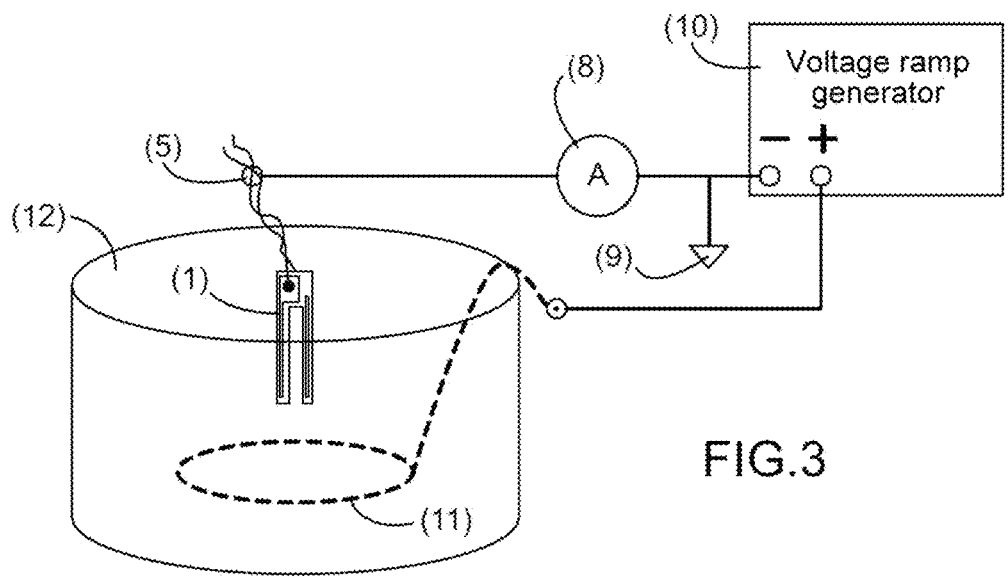
FIG. 3 illustrates the device for carrying out electrolytic deposition in order to obtain a resonator coated with an insulating layer.

The device of FIG. 3 comprises a piezo-electric tuning fork (1) and its two electrodes connected together (7) to an ammeter (8). The ground (9) is connected to the other connector of the ammeter with the negative electrode of the voltage ramp generator (10). The positive electrode of the voltage ramp generator (10) is connected to the counter-electrode in platinum (11) of the electro-deposition bath (12) containing the mixture of cathodic electrophoretic paint diluted in ultrapure water. The use of anodic electrophoretic paint is possible and involves inversion of the polarities of the ramp voltage generator.

Figure 4A:
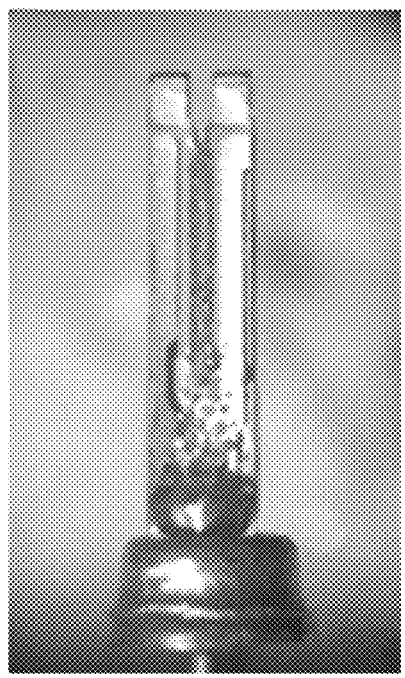
FIG. 4 shows a photograph of the tuning fork obtained during electrochemical deposition of the electrophoretic paint either without optimization of the voltage parameters (no voltage ramp, the voltage being applied directly) (FIG. 4A) or by applying a slow voltage ramp (FIG. 4B).
Figure 4B:
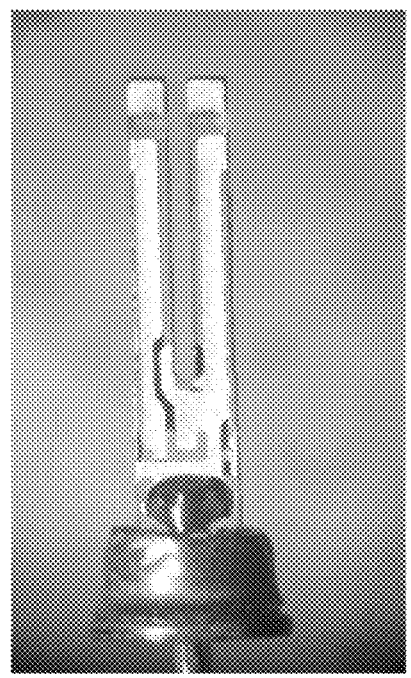

The difficulty remains for the standard tuning fork because of the effects of the meniscus between the branches as shown in FIG. 4A. But after several tests varying the dilution of the paint in the bath (40% in ultrapure Millipore water) and the annealing temperature (140° C. for 15 min), a thin homogeneous layer, without any meniscus effect and without any bubbles trapped in the hardened paint, is obtained in a reproducible way as illustrated in FIG. 4B.

Figure 5A:
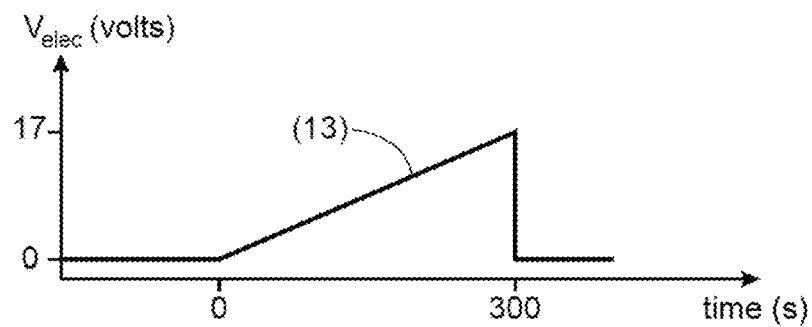
FIG. 5 shows the voltage ramp (13) via the ramp voltage generator in order to optimize the electrophoretic paint layer (FIG. 5A), with simultaneous tracking of the current during the electro-deposition during the first electro-deposition (14) and during the second electro-deposition (15) (FIG. 5B).
Figure 5B:
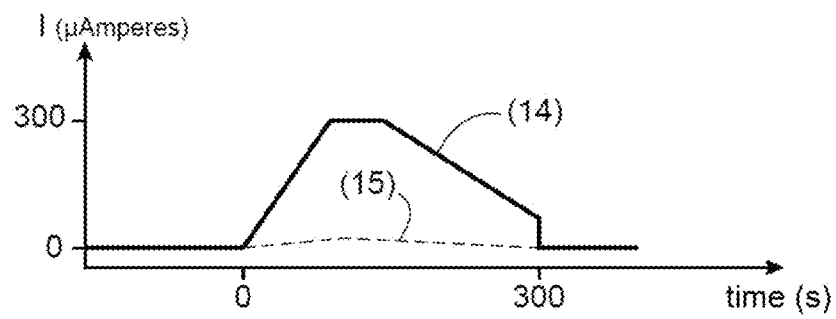

Further, the voltage ramp rate is essential for controlling the thickness and the uniformity of the electro-deposited polymer layer of electrophoretic paint (see FIG. 5). A ramp from 0 V to 17 V in 300 s was found to be optimum (FIG. 5A). The electrophoretic coating operation (electro-deposition in a bath+annealing) has to be repeated 2 or 3 times in order to obtain an efficient insulating coating with a thickness of 3 μm. During the first electro-deposition in the bath, controlling the current gives the possibility of determining a plateau phase during the ramp where the deposition of the layer is finished (a current I is equal to about 300 μA), followed by a decrease of the current to 0 indicating the end of the process (see FIG. 5B).

The insulation of the coating was directly tested by studying the tuning fork coated in a buffer solution (pH=8.2; Tris=10 mM, NaCl=10 mM, MgCl$_2$=10 mM) by producing resonance curves in order to show that the excitation and the detection of the signal from the probe is possible without any problem of current leakages between the electrodes and the conduction solution on the one hand, and, for testing the influence of the liquid environment on the mechanical performances of the probe on the other hand.

Thus, the probe was first of all tested completely immersed in a drop of buffer solution, and then with only the tip adhesively bonded to the end of one of the branches of the tuning fork immersed in the buffer solution. The tip is a platinum/ iridium wire with a diameter of 50 μm and a length of about 4 mm, adhesively bonded with epoxy adhesive onto a branch of the tuning fork coated with electrophoretic paint.

Figure 6:
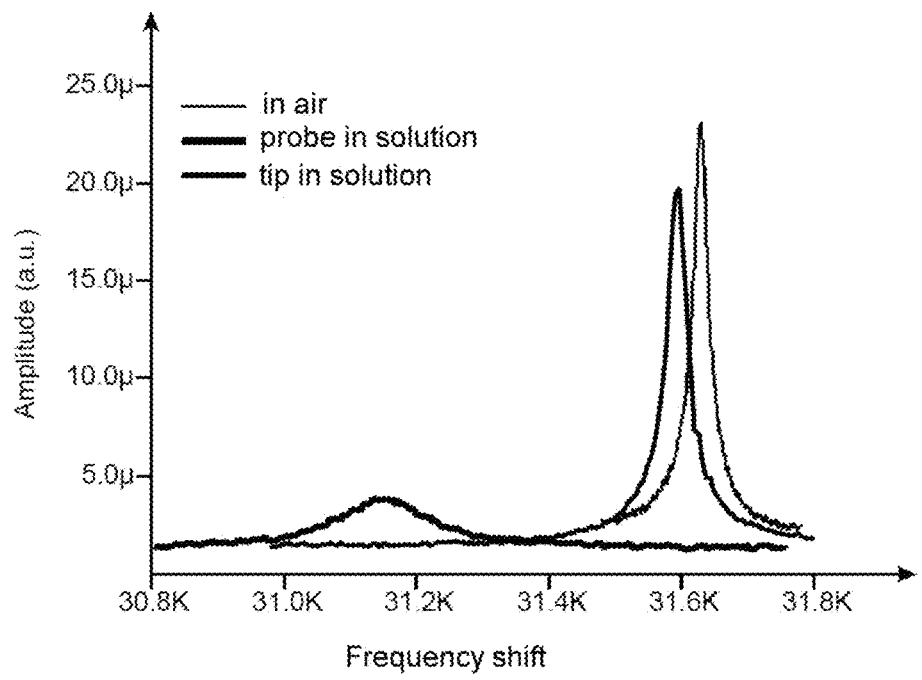
FIG. 6 shows the amplitude resonance curves in three different configurations of the behavior obtained for a same tuning fork coated with the electrophoretic paint: in air, with the sole tip immersed in the solution and with the entire probe immersed in the solution.

Three configurations which are the tuning fork in air, the tuning fork entirely in the buffer solution and only the tip of the tuning fork in the same buffer solution, were studied. As shown in FIG. 6, the resonance curves obtained have a shift in the resonance frequency towards low frequencies when the tip or the complete probe has been immersed in the buffer solution (f0=31'630 Hz in air, f0=31'595 Hz with only the tip in the solution, f0=31'146.8 Hz with the entire probe immersed in the solution). At the same time, the hydrodynamic effects of the liquid (Maali et al., 2005, J. Appl. Phys., Vol. 97, pages 074907.1-074907.6) increase the energy dissipation, lowering the quality factor of the probe (Q=2,000 in air, Q=1,300 with only the tip in a solution, Q=60 with the whole probe immersed in the solution).

This means that the sensitivity of the force detection, depending on the ratio between the quality factor over the stiffness constant of the resonator, will be the best with only the tip immersed in the solution, while keeping the body of the piezo-electric resonator coated with an electrophoretic paint outside the liquid.

II.2. Parylene Coating.

The method is faster than the previous one for obtaining a compliant coating of the probes. This is a one-step method. The parylene deposition allowing the passivation coating, is a pyrolytic physical deposition of monomers, with the sample to be coated at room temperature. This method by pyrolysis is known to one skilled in the art and reference may for example be made to the procedure of E. L. Heintz et al., 2001, IEEE-NANO 2001. Proceedings of the 2001 1st IEEE Conference on Nanotechnology, pp. 346-351 (2001).

Parylene is well known for being hydrophobic and biocompatible, and is widely used for coating surgical tools. There exist several types of parylene. The most efficient for a passivating deposit are parylene N ([2,2]paracyclophane) and parylene C (dichloro[2,2]paracyclophane). The piezo-electric tuning fork was coated in vacuo at room temperature, after having been rinsed with ethanol and acetone. The thickness of the parylene was characterized as 545 nm and is compliant with the shape of the resonator. Parylene N was used in this case.

Figure 7A:
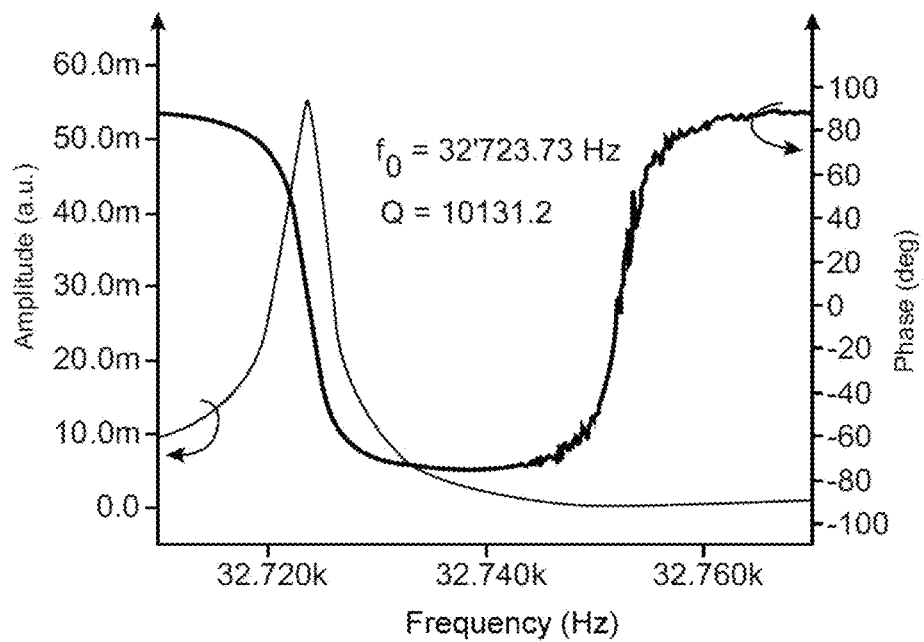
FIG. 7 shows the amplitude (thin lines) and the phase (thick lines) of a same type of tuning fork but coated with a parylene layer: in air (FIG. 7A) and the entire probe immersed in a solution (FIG. 7B).
Figure 7B:
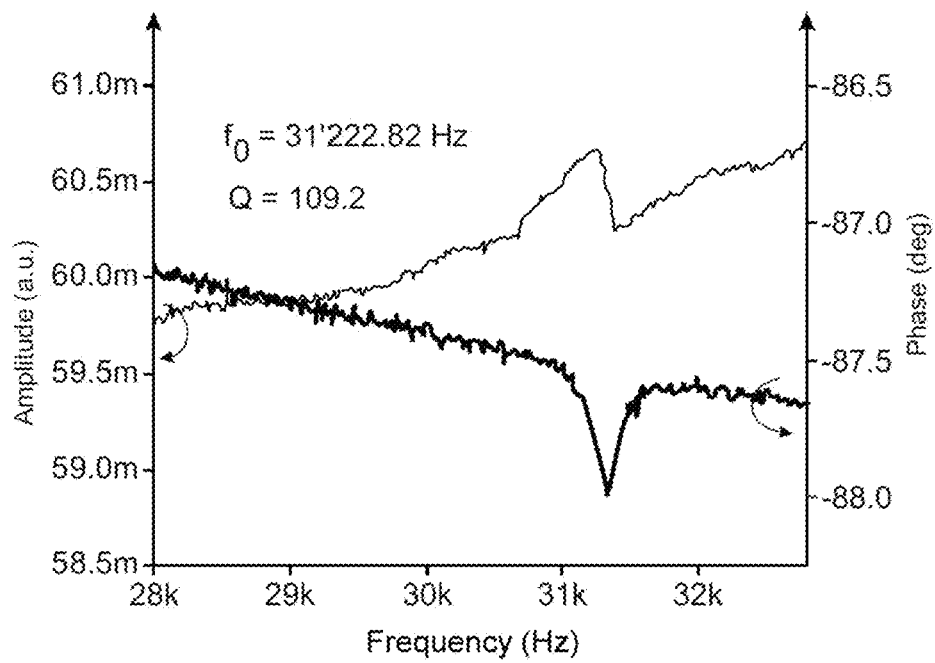

Once again, as shown in FIG. 7, the amplitude and phase resonance curves were made in air (FIG. 7A) and after complete immersion of the same tuning fork in the buffer solution (FIG. 7B).

The thinnest parylene layer compared with the electrophoretic paint layer gives the possibility of keeping a higher quality factor and a higher resonance frequency in air but also in the liquid for the tuning fork (f0=32'724 Hz, Q=10'131 in air and f0=31'223 Hz, Q=109 when the entire probe is immersed in the solution). This means that the sensitivity to force detection, depending on the ratio of the quality factor over the spring constant of the resonator, will be better with a thin parylene layer.

III. Manufacturing and Chemical Functionalization of the Tip.

III.1. Making the Tip on the Piezo-Electric Resonator.

Figure 8:
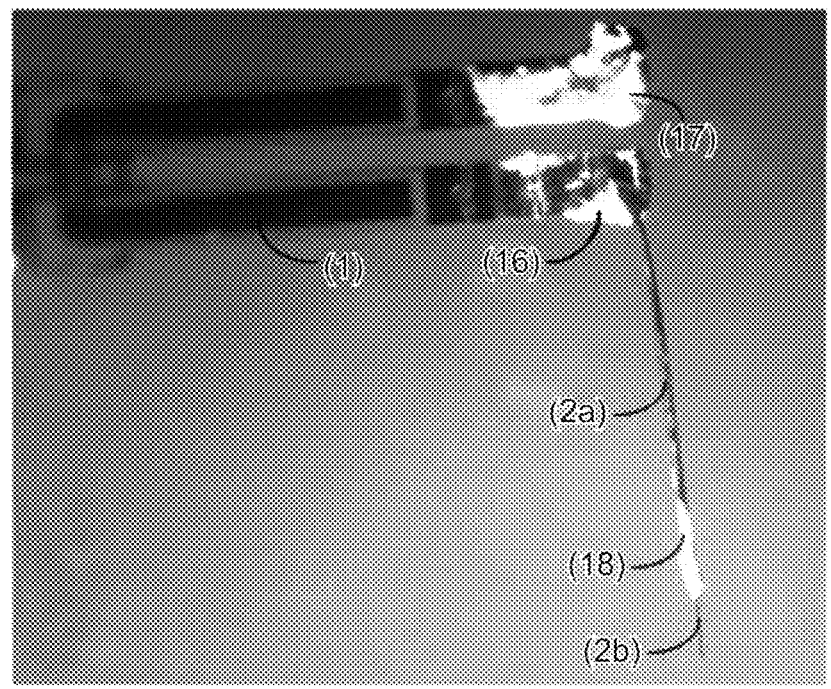
FIG. 8 shows a detailed view of the arrangement of the tip borne by the tuning fork.

As shown in FIG. 8, the body of the tuning fork (1) has, on one of its branches, a stiff tip (2A) in platinum/iridium, maintained with a spot of conductive epoxy adhesive (16), like the Epotek H21D adhesive. A spot of adhesive (17) is also added to the opposite branch so as to preserve the mass symmetry during oscillation and therefore maintaining a high quality factor.

The vibration mode of the tuning fork and the relationship between the mass symmetry of the branches with the quality factor are explained in detail in the article of Ng et al. (2009, Ultramicroscopy, Vol. 109, pages 291-295). At the end of the stiff tip (2*a*), the end of the tip used for the chemical functionalization (2*b*) is also attached to the end of the stiff tip (2*a*) with a spot of conductive epoxy adhesive (18).

The length of the stiff tip (2*a*) and also the length of the flexible tip (2*b*) are very critical for preserving good oscillation properties and for avoiding artifacts in the measurements because of the deformation of the flexible tip (2*b*) during the approach of the tip towards the surface. Therefore, these lengths were controlled by electrochemically etching the tip.

Figure 9:
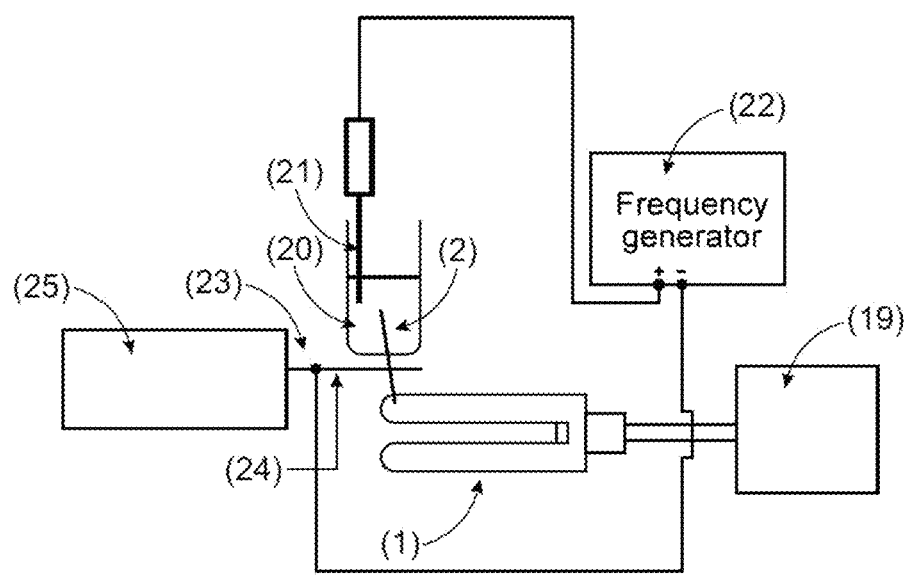
FIG. 9 is a schematization of the configuration used for carrying out the electrochemical cutting as well as the fine etching of the apex of the tip attached on one branch of the piezo-electric tuning fork.

The device for this etching is shown in FIG. 9. The tuning fork (1) is mounted on a transducer Z (19) for controlling the size of the tip (2) to be etched inside the electrochemical solution (20). The counter-electrode (21) connects the electrochemical solution to a connector of a frequency generator (22). The material of the counter-electrode (21) and the chemical composition of the electrochemical solution (20) depend on the material of the tip to be cut or to be etched.

In order to etch and cut the tip of a platinum/iridium wire having a diameter of 50 μm, attached to a tuning fork, a platinum counter-electrode having a diameter of 500 μm and a length of 8 mm was used with an electrochemical $CaCl_2$ (5 g) solution diluted in ultrapure Millipore water (30 ml) with acetone (2 ml).

In order to etch and cut a graphite wire with a diameter of 10 μm, attached on the stiff platinum/iridium tip, a carbon counter-electrode having a diameter of 4 mm and a length of 8 mm was used with an electrochemical solution of $NaHCO_3$ diluted in ultrapure Millipore water (0.07 g/ml). Next, the other connector of the frequency generator is connected (23) to a platinum electrode (24) attached to the XYZ transducer (25) in order to make electric contact with the end of the tip of the tuning fork (2) or at the base of this tip (2) adhesively bonded with conductive epoxy onto the branch of the tuning fork (1). Thus, the waveform, the frequency, the amplitude and the excitation period of the electric signal delivered by the frequency generator (22) give the possibility of controlling the fine etching or the electrochemical cutting of the tip. An ammeter in the circuit gives the possibility of following the etching process and of stopping it in order to obtain fine etching, or of waiting for a measured current of zero which means that the tip is cut.

Figure 10:
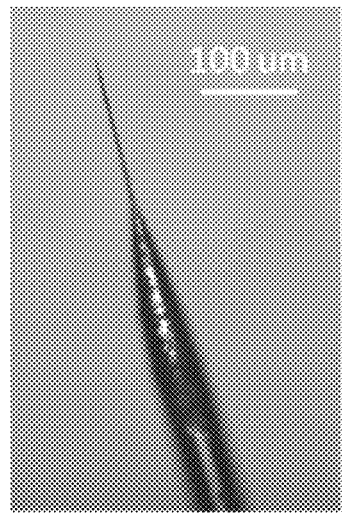
FIG. 10 shows the image in an optical microscope of a platinum/iridium tip with a diameter of 50 µm after etching a fine apex (radius of the end of the tip of less than 100 nm).

For example, in order to cut the tip of a platinum/iridium wire, a continuous 22 volt (peak to peak) sinusoidal waveform with a frequency of 400 Hz was used. In order to etch the apex of the fine platinum/iridium tip, 250 ms bursts, spaced out by 750 ms, of a 22 volt (peak to peak) sinusoidal wave with a frequency of 400 Hz were used (see FIG. 10).

Figure 11A:
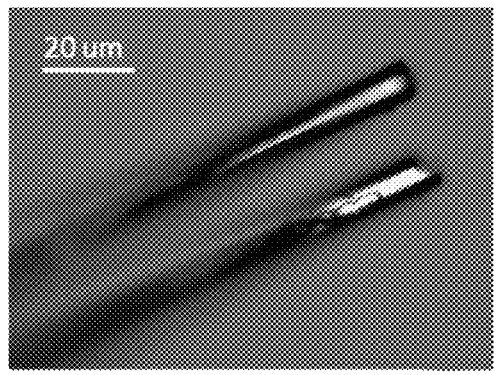
FIG. 11 shows the images in an optical microscope of a graphite tip with a diameter of 10 µm before (FIG. 11A) and after (FIG. 11B) the etching of a fine apex (radius of the end of the tip of less than 1 µm).
Figure 11B:
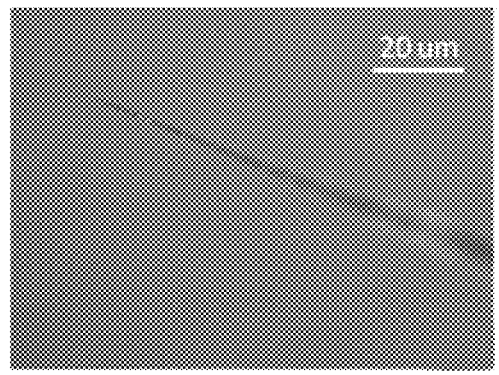

In order to cut the graphite tip, a continuous 16 volt (peak to peak) sinusoidal waveform with a frequency of 46 Hz was used. In order to etch the apex of the fine graphite tip, 250 ms bursts, spaced out by 750 ms, of an 8 volt (peak to peak) sinusoidal wave with a frequency of 46 Hz were used (see FIG. 11).

III.2. Chemical Functionalization of the Tip of the Probe.

Figure 12:
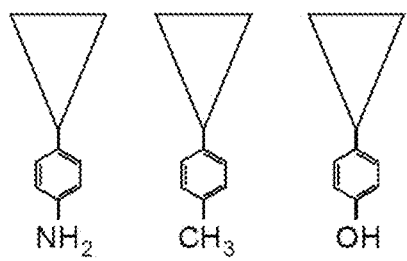
FIG. 12 shows different chemical functionalizations of the end of the tip shown as a triangle, based on the diazonium salt chemistry.

Thus, the end of the tip of the probe in graphite was selectively grafted with φ-OH (hydroxyl), φ-$NH_2$ (amine) or φ-$CH_3$ (methyl) groups, as illustrated in FIG. 12. The direct grafting of proteins on the end of the tip may also be contemplated.

A. Functionalization with φ-$NH_2$

Solution No. 1 (100 ml of 0.1M amine):

1.8107 g of 1,4-phenylenediamine (for example from Sigma-Aldrich) are dissolved in 100 ml of 0.5 M HCl (21.64 ml of 37% HCl in 500 ml of $H_2O$). The following product which may be used for about 2 hours at room temperature is obtained:

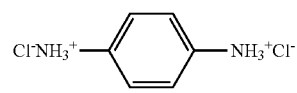

Solution No. 2 (100 ml of 0.1M $HNO_2$):

0.69 g of sodium nitrite $NaNO_2$ (for example from Fluka) are dissolved in 100 ml of ultrapure Millipore water in order to achieve the following chemical reaction:

$$NaNO_2 + H_2O \rightarrow HNO_2 + NaOH$$

Mixing the Solutions No. 2 and No. 1:

A magnetic bar is placed in the reaction bath. And 10 ml of solution No. 2 are placed dropwise in 10 ml of solution No. 1, this is the first diazotization such that:

$$HNO_2 + NH_2\text{-}\phi\text{-}H_3^+NCl^- \rightarrow 2H_2O + NH_2\text{-}\phi\text{-}N_2^+Cl^-$$

The stirring is maintained for 5 mins, the reaction bath then assuming a brown-orange color with foam at the surface. Next, 1.5 g of iron powder is then added as a reducing agent thereby allowing:

$$H_3^+N\text{-}\phi\text{-}N_2^+ + Fe + 3H^+ \rightarrow H_3^+N\text{-}\phi' + Fe^{2+} + N_2$$

The mixture is then heated to 40° C. for a duration Δt in order to polymerize a layer of several diazonium salts with a —$NH_2$ termination on the surface immersed in the bath and to be functionalized. The thickness and thus the density of the grafted φ-$NH_2$ may be controlled by adjusting Δt. A Δt of 15 min was used for functionalizing the apex of the graphite tip.

Finally, the functionalized surface was rinsed with acetone and with ethanol, before being dried under nitrogen.

B. Functionalization with φ-$CH_3$ 0.294 g of a zinc chloride hemi-salt of p-diazo-N,N-diethyl-m-toluidine (formula below) are diluted in 20 ml of ultrapure Millipore water:

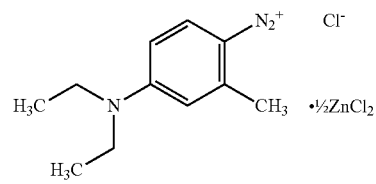

The solution is stirred for 30 min, before adding 1.5 g of iron powder in the bath.

The surface to be functionalized (i.e. the end of the graphite tip) in this bath is immersed for 15 min, before being rinsed with acetone and ethanol and dried under nitrogen.

C. Functionalization with φ-OH

The followed procedure is identical with the one for functionalization with φ-$NH_2$.

The functionalized surface of the apex is placed, for 2 min in a 15 ml HCl bath with 15 ml of NaNO$_2$ for again diazotizing the terminal —NH$_2$ and replacing it with a —N$_2^+$ group.

Straightaway afterwards, in a location protected from light, a drop of ultrapure Millipore water is placed on the surface bearing —N$_2^+$ groups and maintained for 60 min before rinsing the surface with ethanol and drying it with nitrogen. Thus, the —N$_2^+$ group is replaced with a hydroxyl group with which a stable phenol may be obtained.

D. Functionalization of a Gold-Plated Mica with φ-Protein (BSA)

Figure 13:
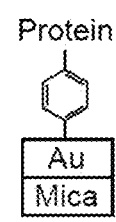
FIG. 13 shows the chemical functionalization by BSA of a surface based on the diazonium salt chemistry.

A mica gold-plated beforehand by spraying or thermal evaporation of a gold layer of a few tens of nanometers thick, on which the procedure similar to the one for the functionalization with φ-OH is applied; except that in the last step, instead of adding a drop of ultrapure Millipore water, a protein solution is deposited and left for 15 min, before rinsing with a buffer solution (such as 10 mM PBS or Tris). The prepared protein solution is a solution of 25 mg of BSA (bovine serum albumin) in 4 ml of ultrapure Millipore water. The thereby prepared surface is schematized in FIG. 13.

IV. <<Molecular Harpoon>> Experiments.

IV.1. Principle and Conditions.

It is well known that by acting on the pH of the solution, the chemical functions at the end of the tip may bind with priority the groups —COOH or —NH$_2$ of certain amino acids of proteins via hydrogen bonds.

Therefore, all the <<molecular harpoon>> experiments were conducted with a buffer solution of Tris=10 mM, MgCl$_2$=10 mM and NaCl=10 mM with a pH=8.2 for activating hydrogen bonds with the proteins grafted on the test surface. The functionalized tip of the probe is immersed in this solution.

The test surface is a freshly cleaved mica sample, coated with gold and covered with diazonium salts for grafting BSA. Functionalization of the gold-covered mica surface with the diazonium salt and BSA was checked by Fourier transform infrared spectroscopy or <<FTIR spectroscopy>>.

As the size of the end of the tip in graphite is too small for being characterized by FTIR spectroscopy or X photoelectron spectroscopy (XPS) analysis, only the spectroscopy of chemical force spectroscopy discussed in the results hereafter gives the possibility of checking the functionalization of the tip.

Thus, a combination of different chemical force spectroscopy experiments was conducted with the piezo-electric probe prepared according to the procedures of points I, II and III above in the AM-AFM mode by means of the approach-withdrawal curves towards the surface. The acquired output signals are the amplitude of oscillation and the phase lag relatively to the relative tip-surface distance. These two pieces of information (amplitude and phase relatively to the distance) may then be used for recovering the chemical interaction forces by using the formalism proposed elsewhere. (Sader et al., 2004; Katan et al.; Uchihashi et al., 2004).

IV.2. Results on a Non-Functionalized Surface.

In order to check selectivity of the <<molecular harpoons>> grafted at the end of the tip, the tests were first carried out on a clean mica surface, coated with gold without any chemistry, with three different tip ends -OH, φ-NH$_2$ and φ-CH$_3$).

Figure 14A:
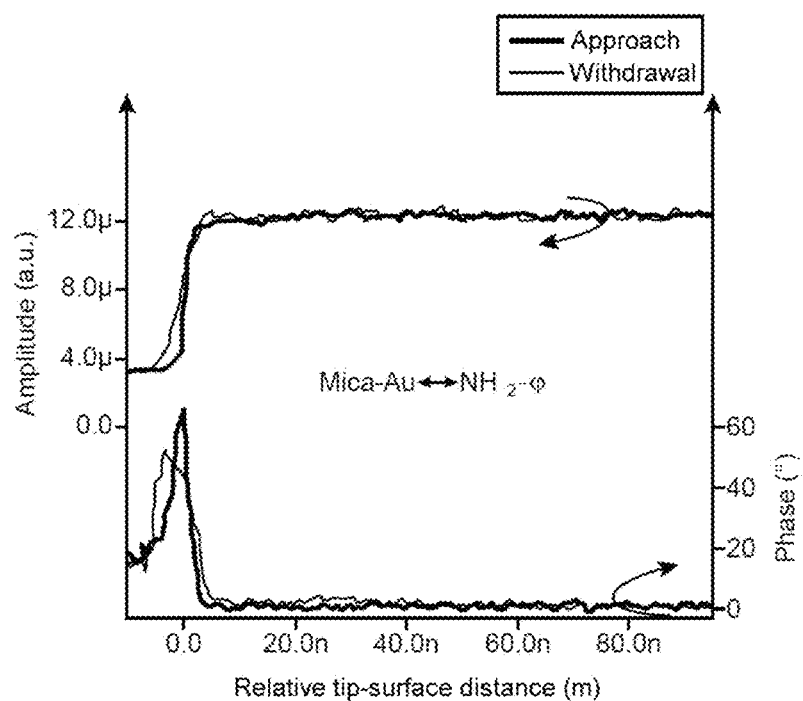
FIG. 14 shows three approach-withdrawal curves carried out on a mica surface, coated with gold, clean without any chemistry, with tips, the end of which is functionalized with φ-NH$_2$ (FIG. 14A), φ-CH$_3$ (FIG. 14B) and φ-OH (FIG. 14C). No specific chemical product of the grafting appears.
Figure 14B:
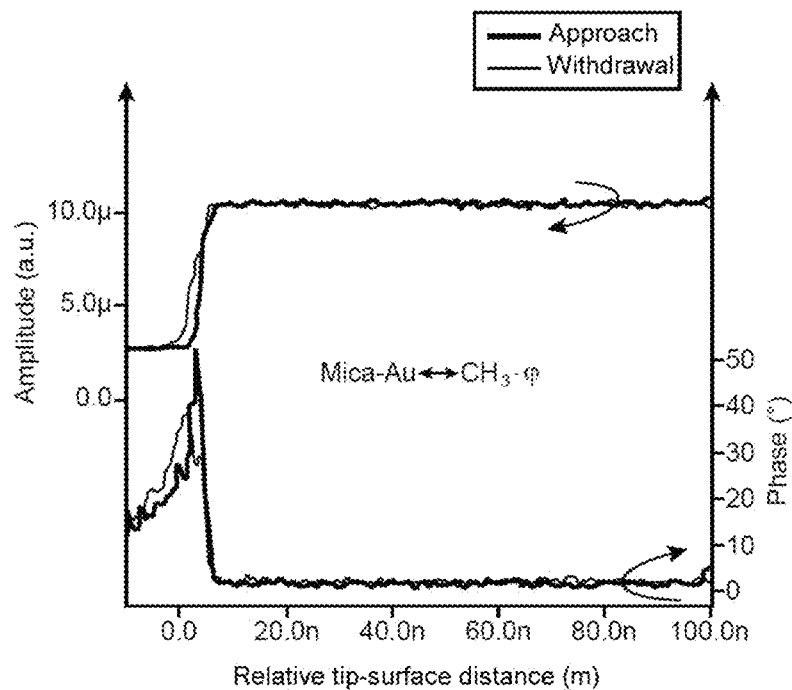
Figure 14C:
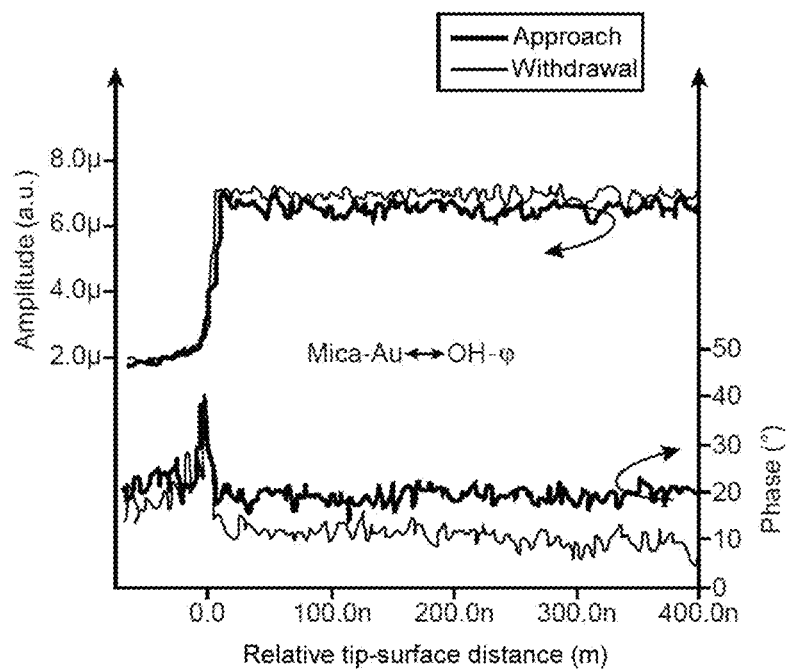

FIG. 14 illustrates three approach/withdrawal curves obtained under these conditions. The amplitude and the phase signal are acquired simultaneously with, in thick lines, the curves of approach towards the surface and, in thin lines, the withdrawal curves, when the tip is withdrawn.

The decrease in the amplitude and the increase in the phase are synonymous because the tip comes into contact with the surface. The approach and withdrawal curves for each case are very much the same. This means that no chemical grafting appears between the end of the tip and the surface.

IV.3. Results on a Surface Functionalized with BSA Proteins.

By using the same tips, the end of which is functionalized with φ-OH, φ-NH$_2$ or φ-CH$_3$, the same approach/withdrawal curves were carried out on a mica surface, covered with gold and grafted with BSA proteins.

By comparing the results obtained in FIG. 15 with those of FIG. 14, clear differences appear in the withdrawal curve (thin lines) showing various sudden steps, more visible on the phase curve. Each step corresponds to the detachment of one or more chemical bonds during the approach of the tip and during the dwelling time of the end of the tip on the surface, controlled by the return force given by the piezo-electric probe.

Therefore, a clear signature of certain specific molecular bonds between the chemistry of the tip and the biochemistry of the surface may be obtained, by means of chemical force curves with a probe with an integrated piezo-electric sensor operating in a saline environment required for studying biological material.

On the basis of prior work (Wang et al., 2004, Langmuir, Vol. 20, pages 7753-7759; Ebner et al., 2005, ChemPhysChem, Vol. 6, pages 897-900), the sensitivity of the system is of the order of about hundred picoNewtons.

Figure 15A:
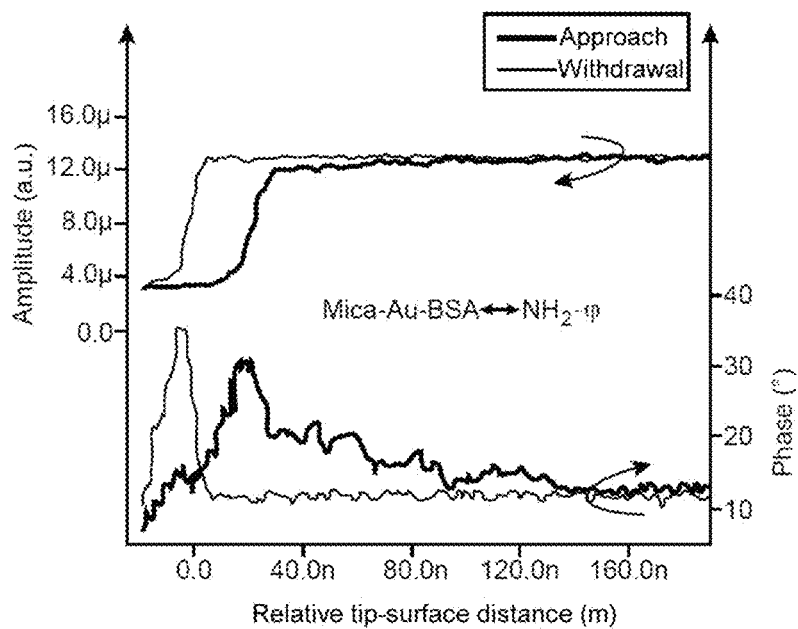
FIG. 15 shows three approach-withdrawal curves carried out on a mica surface, coated with gold and functionalized with BSA, with tips, the end of which is functionalized with φ-NH$_2$ (FIG. 15A), φ-CH$_3$ (FIG. 15B) and φ-OH (FIG. 15C). A specific chemical grafting signature clearly appears on the withdrawal curve. The graph of FIG. 15D has a tip, the end of which is non-functionalized, used for probing the mica surface, coated with gold and functionalized with BSA.
Figure 15B:
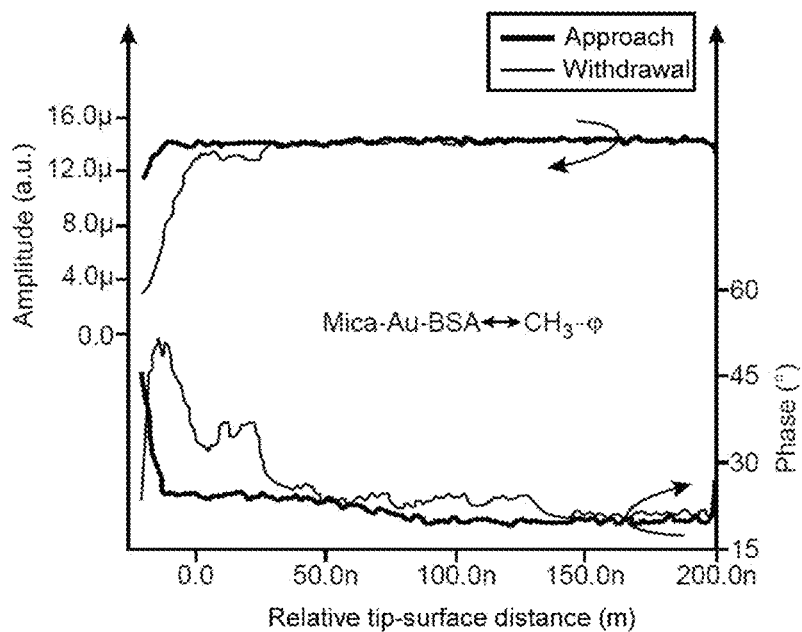
Figure 15C:
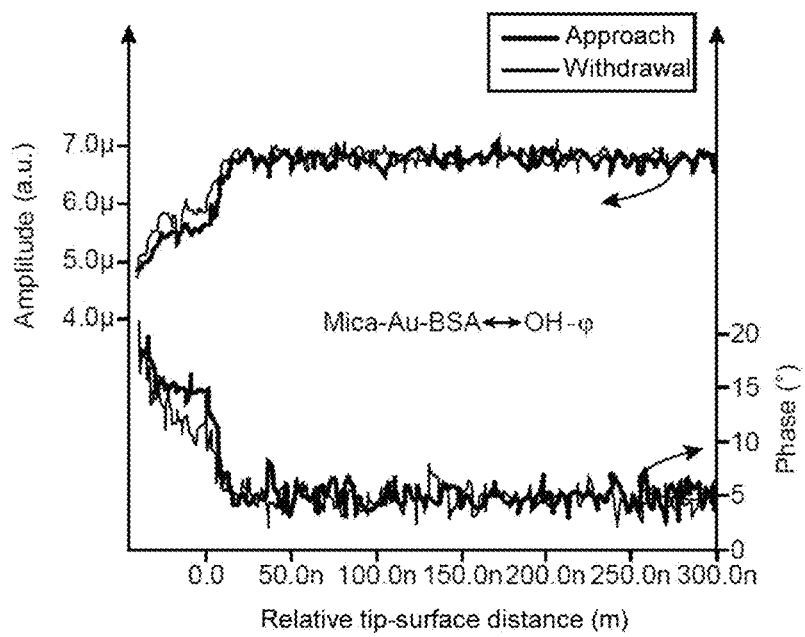
Figure 15D:
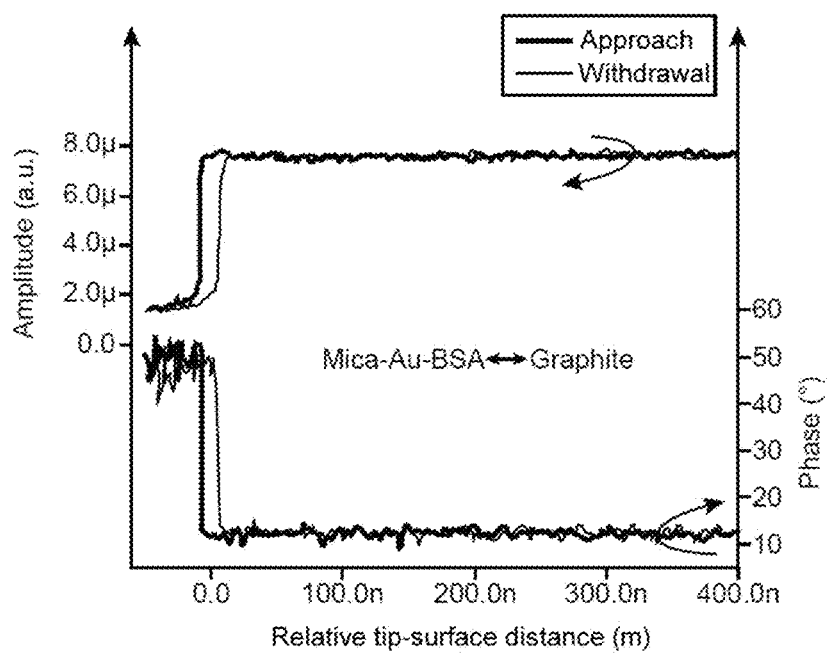

The graph of FIG. 15D shows the curves obtained by using a graphite tip, the end of which is non-functionalized and the same mica surface coated with gold and functionalized with BSA. In the latter case, no specific chemical grafting appears on the withdrawal curves (the approach and withdrawal curves for each case are very much the same) which demonstrates that the chemical force curves with sudden steps during the withdrawal of the tip are actually due to the presence of a specific chemistry and controlled both at the end of the tip and at the surface of the sample.

What is claimed is:

1. An atomic force microscope probe comprising:
a piezo-electric resonator made of a single piezo-electric material provided with two electrodes and coated with an insulating layer; and
a tip attached on the resonator coated and functionalized with at least one group or molecule of interest.

2. The probe according to claim 1, wherein the piezo-electric material is selected from the group consisting of quartz, topaz, tourmaline, berlinite, aluminum nitride, zinc oxide, cadmium sulfide, lead titanate, lead titanium-zirconate, lithium niobate, lithium tantalate, potassium niobate, langasite, gallium arsenide, sodium barium niobate, germanium bismuth oxide, indium arsenide, antimonide, and a piezo-electric polymer.

3. The probe according to claim 1 wherein the electrodes are metal and notably in a metal selected from gold, nickel, aluminum, copper, tin and silver.

4. The probe according to claim 1, wherein the piezo-electric resonator provided with the two electrodes appears as a piezo-electric tuning fork with an electrode positioned on each of the branches of the tuning fork, or in an interdigitation configuration of the electrodes positioned on both branches of the tuning fork.

5. The probe according to claim 1, wherein the insulating layer comprises:
a commercial electrophoretic cathodic or anodic paint; or a material selected from silicon dioxide, parylene or another derivative of paracyclophane, polyimidine, aluminum oxide, aluminum nitride, a vinyl polymer and a hydrophobic silane.

6. The probe according to claim 1, wherein the tip comprises:
   a first element attached to the resonator; and
   a second element attached to the first element and functionalized with a group or molecule of interest.

7. The probe according to claim 6, wherein the first element is a platinum/iridium wire and the second element is a platinum wire, a graphite fiber or a carbon nanotube.

8. The probe according to claim 1, wherein the group of interest is selected from OH, C(O)OH, $NH_2$, $CH_3$, $C(O)O^-$, $NH_3^+$, C(O)H, $N_3$ and a terminal alkene.

9. The probe according to claim 1, wherein the molecule of interest is selected from peptides, proteins such as enzymes, antibodies or antibody fragments, cell or membrane receptors, polysaccharides, cells or cell portions such as organites or cell membranes, nucleic acids such as DNA and RNA, and natural or synthetic molecules with a therapeutic purpose.

10. The probe according to claim 1, wherein the functionalization of the tip with the group or molecule of interest is indirect and involves a linker covalently bound to the tip on the one hand and to the group or molecule of interest on the other hand.

11. The probe according to claim 10, wherein the linker comprises a (hetero)arylene group.

12. The probe according to claim 11, wherein the linker comprises a polyethylene glycol (PEG) group.

13. A method for preparing an atomic force microscope probe according to claim 1, the method comprising:
    depositing on a resonator provided with two electrodes an insulating layer;
    attaching a tip, on the resonator provided with two electrodes and coated with an insulating layer obtained in the depositing;
    optionally cutting and/or etching the tip attached during the attaching;
    functionalizing the tip attached and refined during the attaching and the optionally cutting and/or etching with a group or molecule of interest.

14. The method according to claim 13, wherein the deposition during the depositing is a pyrolytic physical deposition or an electro-deposition.

15. The method according to claim 13, wherein the optionally cutting and/or etching is a step for electrochemical etching of the tip.

16. The method according to claim 13, wherein the functionalizing applies at least one element selected from an aryl diazonium salt bearing a group of interest or a precursor of such a group, an aryl diazonium salt bearing a molecule of interest or a precursor of such a molecule, an aryl diazonium salt bearing an amine function or a precursor of such aryl diazonium salts.

17. A method of performing a chemical force spectroscopy in a biological solution by placing the functionalized tip of a probe as defined in claim 1 in the biological solution.

18. A method of performing Atomic Force Microscope imaging in a biological solution by placing the functionalized tip of a probe as defined in claim 1 in the biological solution.

19. The method according to claim 17, wherein the probe is used in a dynamic mode at an excitation frequency close to or equal to its resonance frequency.

20. The method according to claim 17, wherein the probe is used in a dynamic mode off-resonance at an excitation frequency away from its resonance frequency, or at a frequency corresponding to a different harmonic of its fundamental resonance frequency.

21. The method according to claim 18, wherein the probe is used in a dynamic mode at an excitation frequency close to or equal to its resonance frequency.

22. The method according to claim 18, wherein the probe is used in a dynamic mode off-resonance at an excitation frequency away from its resonance frequency, or at a frequency corresponding to a different harmonic of its fundamental resonance frequency.

* * * * *